(12) United States Patent
Feyereisen et al.

(10) Patent No.: US 7,375,678 B2
(45) Date of Patent: May 20, 2008

(54) DISPLAYING OBSTACLES IN PERSPECTIVE VIEW

(75) Inventors: Thea L. Feyereisen, Hudson, WI (US); Gang He, Morristown, NJ (US); Blake W. Wilson, Peoria, AZ (US); John G. Suddreth, Cave Creek, AZ (US); Ivan S. Wyatt, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 226 days.

(21) Appl. No.: 11/169,515

(22) Filed: Jun. 29, 2005

(65) Prior Publication Data

US 2007/0018887 A1    Jan. 25, 2007

(51) Int. Cl.
*G01S 7/04* (2006.01)
*G06T 15/10* (2006.01)

(52) U.S. Cl. .................. 342/180; 345/419; 463/33
(58) Field of Classification Search ............... 342/176, 342/179, 180; 345/419–420, 427; 340/945–980; 463/32–33
See application file for complete search history.

(56) References Cited

U.S. PATENT DOCUMENTS

| | | | | |
|---|---|---|---|---|
| 3,896,432 A | * | 7/1975 | Young | 342/33 |
| 3,988,731 A | * | 10/1976 | Young | 342/179 |
| 5,313,201 A | * | 5/1994 | Ryan | 340/961 |
| 5,339,085 A | * | 8/1994 | Katoh et al. | 342/180 |
| 5,798,713 A | * | 8/1998 | Viebahn et al. | 340/974 |
| 5,838,262 A | * | 11/1998 | Kershner et al. | 340/945 |
| 5,844,562 A | * | 12/1998 | Harrison | 345/419 |
| 5,995,903 A | * | 11/1999 | Smith et al. | 701/211 |
| 6,241,609 B1 | * | 6/2001 | Rutgers | 463/31 |
| 6,329,986 B1 | * | 12/2001 | Cheng | 345/419 |
| 6,667,710 B2 | * | 12/2003 | Cornell et al. | 342/26 R |
| 6,672,961 B1 | * | 1/2004 | Uzun | 463/31 |
| 6,766,245 B2 | * | 7/2004 | Padmanabhan | 701/207 |
| 7,046,242 B2 | * | 5/2006 | Kitsutaka | 345/419 |
| 7,118,480 B2 | * | 10/2006 | Aoki | 463/30 |
| 2003/0179109 A1 | * | 9/2003 | Chamas et al. | 340/973 |
| 2004/0160341 A1 | * | 8/2004 | Feyereisen et al. | 340/970 |
| 2007/0018887 A1 | * | 1/2007 | Feyereisen et al. | 342/176 |

* cited by examiner

*Primary Examiner*—Thomas Black
*Assistant Examiner*—Shelley Chen
(74) *Attorney, Agent, or Firm*—Ingrassia Fisher & Lorenz

(57) ABSTRACT

A system and method for displaying obstacles in a conformal perspective view. The system comprises a display screen for graphical display of data, at least one obstacle data source, one or more graphics processors for receiving obstacle data from the at least one obstacle data source, and for providing input to the display screen. The display screen displays obstacles in a 3-dimensional graphical representation of real space. The display size of the obstacles varies based on the distance to the obstacles. Obstacles located beyond a selected distance are displayed as semi-transparent line objects and obstacles located within the selected distance are displayed as semi-transparent polygons.

43 Claims, 4 Drawing Sheets

DISPLAYING OBSTACLES IN PERSPECTIVE VIEW

TECHNICAL FIELD

The present invention generally relates to graphical displays and, in particular, to displays used in operating a craft.

BACKGROUND

It is crucial for operators in various types of crafts, such as an aircraft, lunar lander or submarine, to be aware of the conditions of the space surrounding the craft, i.e. situational awareness. For example, modem aircraft attempt to help improve the operator's situational awareness by providing the operator with information on either a heads-up display (HUD) or a look-down display. A typical display depicts many forms of relevant information, such as navigational data, weather data, terrain data, and radar, as well as other important information regarding the craft itself.

One important aspect of situational awareness is to be aware of obstacles which pose a threat to the craft. This is particularly true for aircraft during take-offs and landings or other low-altitude operations and even more so in low-visibility conditions. Some displays depict information on obstacles in or near the craft's travel path. However, many of these displays create a problem of clutter on the display which interferes with the visibility of other primary information presented on the display. Obstacle data should be presented in such a way that it will provide timely awareness of the height, location and distance of possible threats without distracting from the other primary information on the display.

Another disadvantage of current obstacle displays is that they do not provide the operator with easy access to relational positions and depth perception of the possible threats in the craft's travel path. In order to successfully avoid the obstacles, the operator needs to know where the obstacles are in relation to each other and to the craft. Often times, the operator will have a short response time in which to determine how to best avoid obstacles. Therefore, it is advantageous to reduce the time and effort required by current obstacle displays for the operator to obtain the needed relational position information.

For the reasons stated above, and for other reasons stated below which will become apparent to those skilled in the art upon reading and understanding the present specification, there is a need in the art for an obstacle display which will improve an operator's easy access to obstacle information regarding distance, height, and relational position of obstacles without distracting from other primary information.

SUMMARY

The problem of providing a display which improves an operator's easy access to obstacle information without distracting from other primary information is solved by the present invention.

In one embodiment, a display system comprising a display screen for graphical display of data, at least one obstacle data source, one or more graphics processors for receiving obstacle data from the at least one obstacle data source, and for providing input to the display screen is provided. The display screen displays obstacles in a 3-dimensional graphical representation of real space. The display of the obstacles varies based on the distance to the obstacles where obstacles located beyond a selected distance are displayed as semi-transparent line objects and obstacles located within the selected distance are displayed as semi-transparent polygons. The display size of the obstacles is further varied based on the distance to the obstacles.

In another embodiment, a method for displaying obstacles in perspective view is provided. The method comprises searching for obstacles around a specified location, determining if obstacles are within a selected distance around said specified location, rendering obstacles located with a first range of distances as semi-transparent lines, and rendering obstacles located with a second range of distances as semi-transparent polygons.

The present invention together with the above and other advantages may best be understood from the following detailed description of the embodiments of the invention illustrated in the drawings, wherein:

DRAWINGS

DETAILED DESCRIPTION

Figure 1:
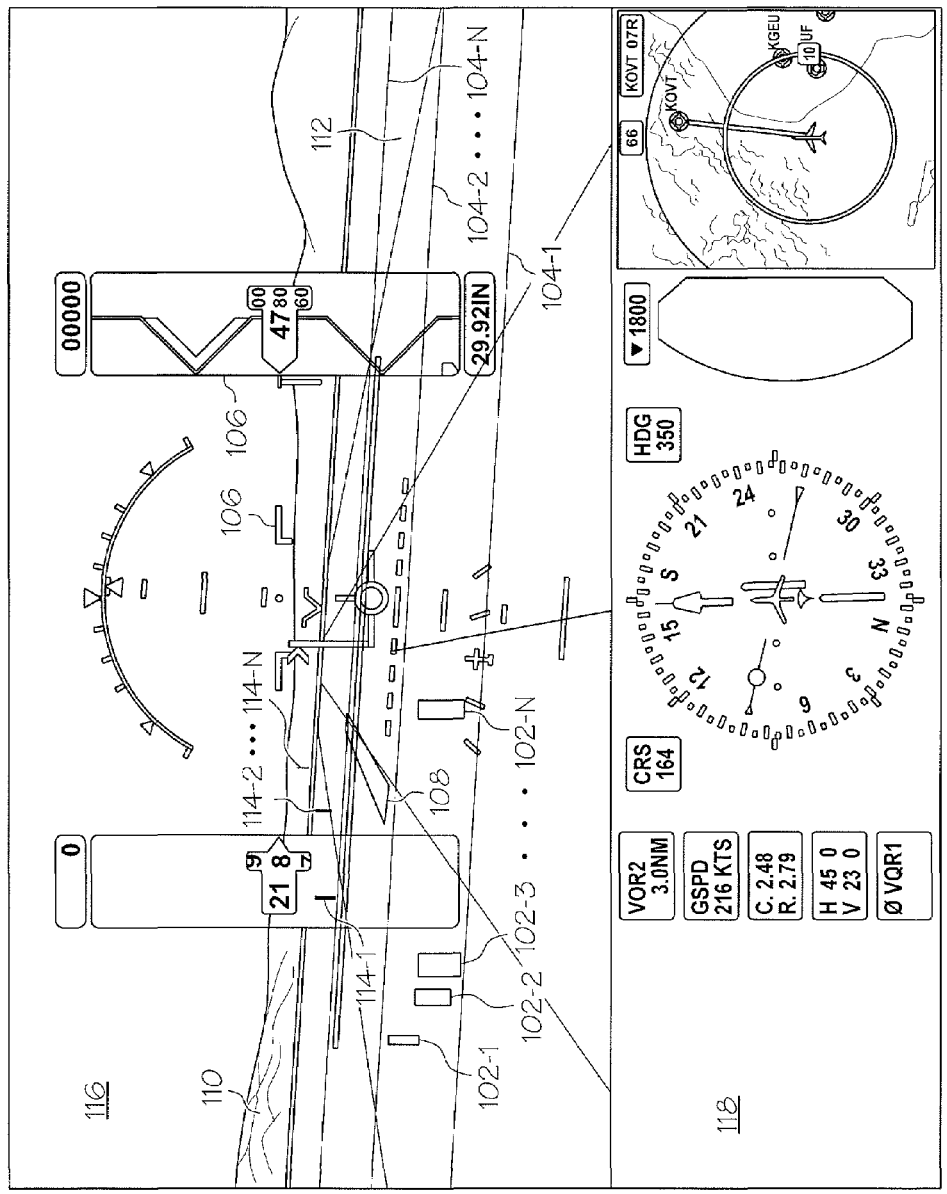
FIG. 1 is an image of a graphical display according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. Furthermore, it will be understood by one of skill in the art that although the specific embodiments illustrated below are directed at aircraft for purposes of explanation, the method and apparatus may be used in various embodiments employing various types of crafts, such as submarines, space craft, lunar landers, and unmanned air vehicles (UAV), etc. The following detailed description is, therefore, not to be taken in a limiting sense.

Embodiments of the present invention may be described in terms of functional block diagrams and various processing steps. It should be appreciated that such functional blocks may be realized in many different forms of hardware, firmware, and or software components configured to perform the various functions. For example, embodiments of the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing figures or the specification are not to be construed as limiting the order in which the individual processing steps may be performed.

FIG. 1 is an image of a graphical display according to one embodiment of the present invention. The graphical display in FIG. 1 is divided into two portions, 116 and 118. Portion 116 is used for displaying a graphical view of the real world ahead of the aircraft as well as primary flight symbology 106. Portion 118 is used for displaying other flight information to the pilot.

The graphical view in portion 116 contains representations of the terrain, such as mountains 110, runway 108, and ground 112. Additionally, the view is used to display reference grid lines 104-1 . . . 104-N and representations of obstacles 102-1 . . . 102-N and 114-1 . . . 114-N. As is shown, obstacles 102-1 . . . 102-N, obstacles 114-1 . . . 114-N and grid lines 104-1 . . . 104-N are semi-transparent. This transparency enables obstacles 102-1 . . . 102-N, obstacles 114-1 . . . 114-N and grid lines 104-1 . . . 104-N to be displayed without interfering with the visibility or readability of primary flight symbology 106. In some embodiments, the transparency level is set at levels which allow substantial blending with background terrain color. Additionally, grid lines 104, obstacles 102-1 . . . 102-N and obstacles 114-1 . . . 114-N have a default color substantially blended with the terrain color. This default color blend further aids in allowing grid lines 104-1 . . . 104-N, obstacles 102-1 . . . 102-N and obstacles 114-1 . . . 114-N to be displayed without distracting from primary flight symbology 106. As threat data is received and analyzed regarding obstacles 102-1 . . . 102-N, the color and highlighting of obstacles 102-1 . . . 102-N will change accordingly. In one embodiment, the color and highlighting of obstacles 102-1 . . . 102-N changes to correspond to Terrain Awareness and Warning System (TAWS) alerts such as found in Honeywell's Enhanced Ground Proximity Warning System (EGPWS).

The decision to render obstacles as simple line objects, such as obstacles 114-1 . . . 114-N, or as polygons, such as obstacles 102-1 . . . 102-N, is based on the distance to each obstacle. In order to give an operator a quick perspective on the relative position of obstacles, obstacles located beyond a selected distance from the aircraft are rendered as simple line objects, whereas, obstacles located within that selected distance are rendered as polygons. As can be seen in FIG. 1, embodiments of the present invention give an operator a quick perspective on the relative position of obstacles. By merely glancing at the display in FIG. 1, one can easily ascertain that obstacles 114-1 . . . 114-N are located further from the aircraft than are obstacles 102-1 . . . 102-N.

To further aid in this perspective view, the relative polygon size of obstacles 102-1 . . . 102-N and relative line object size of obstacles 114-1 . . . 114-N will also depend on the distance to each obstacle. For example, as shown in FIG. 1, obstacle 102-1 is smaller than obstacle 102-2 which in turn is smaller than obstacle 102-3. This represents the fact that obstacle 102-1 is further from the aircraft than obstacle 102-2 which in turn is further from the aircraft than obstacle 102-3. As the aircraft moves toward an obstacle, the size of the object (i.e. polygon or line object) representing the obstacle increases. As the aircraft moves away from an obstacle, the size of the object representing the obstacle decreases. Changing the size of the objects in this manner makes the view substantially conformal to a real-world view of the same area.

The graphical display system of one embodiment of the present invention improves the utility over existing systems by assigning a selected fixed-width to obstacles 102-1 . . . 102-N represented by polygons. In one embodiment the fixed-width is 50 feet. In another embodiment, where a data source contains additional shape information such as obstacle type or width and depth information, the display will render a polygon representative of the shape of the obstacle. For example, if a data source indicates that a particular obstacle is a bridge, the display will render a polygon which appears substantially like a bridge. In other embodiments, the obstacles are assigned a fixed-width despite the availability of other information. For example, in one embodiment when it is desired to minimize processor load, the polygons are rendered representative of obstacles with a fixed-width rather than as representative of the actual shape of the obstacle.

In some embodiments, each fixed-width polygon is actively rotated such that the face of each polygon is substantially facing the viewer situated at the center of the screen. This active rotation maintains the face of each fixed-width polygon substantially facing the display viewer screen during flight maneuvers or display view adjustments until an obstacle is no longer in the field of view displayed on the screen. For example, if the display view is facing north, the width of the fixed-width polygons will be displayed to run east-west. As the view changes direction to face east, the display width of the fixed-width polygons will change accordingly to run north-south. If the fixed-width polygons were not actively rotated they might disappear from the display screen which would happen if the display width of the polygons ran in the same direction as the view orientation. This active rotation adds the benefit of preventing obstacles 102-1 . . . 102-N from shrinking or disappearing from the screen due to flight maneuvers or adjustments in the display view. The result of active rotation can be seen in FIG. 1 where the face of each polygon of obstacles 102-1 . . . 102-N is substantially facing the display viewer and can be clearly seen in the screen. In other embodiments, this active rotation is not used for polygons that are rendered as representative of actual shape of an obstacle since the polygon is less likely to disappear from the screen due to flight maneuvers.

Figure 2:
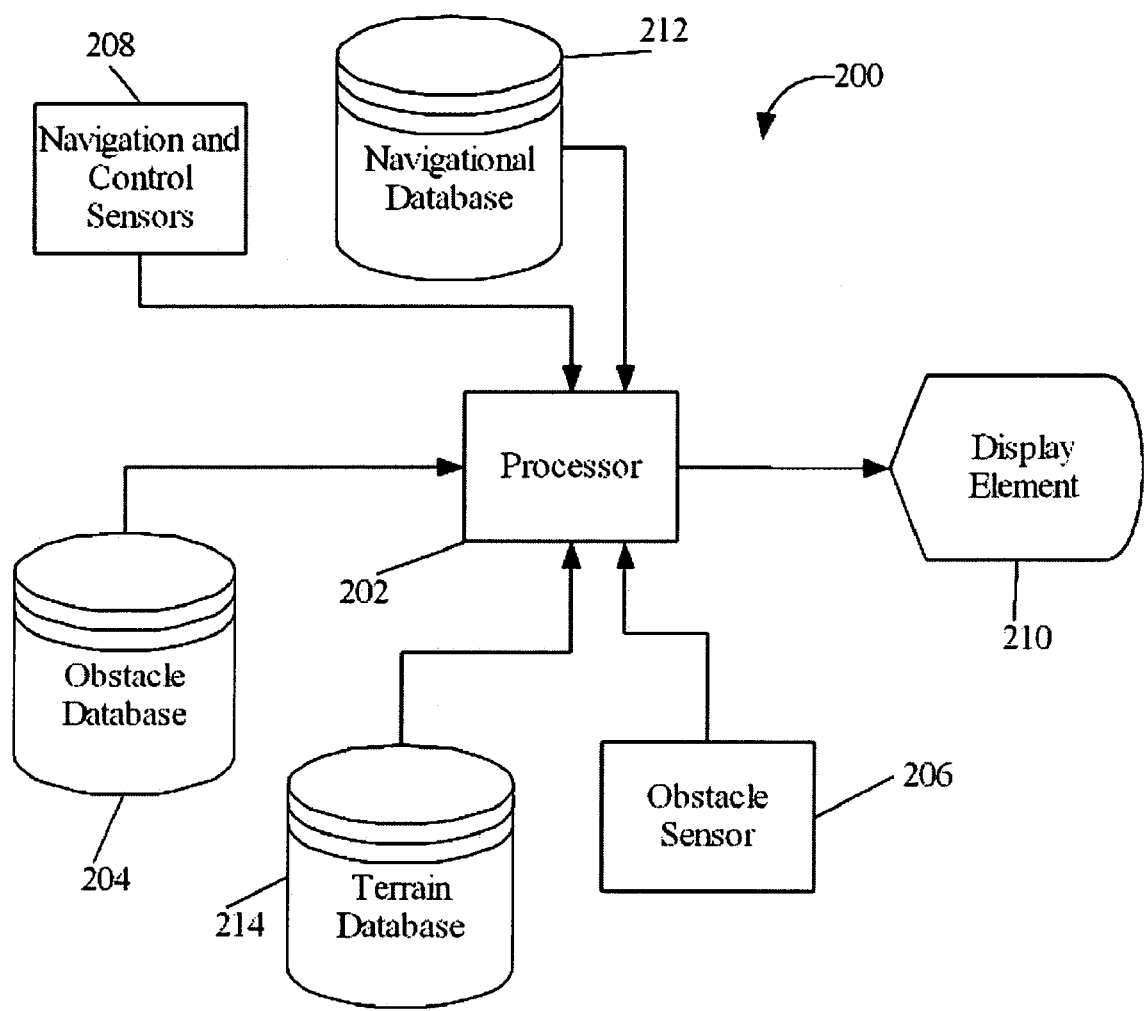
FIG. 2 is a block diagram of a graphical display system according to one embodiment of the present invention.

FIG. 2 is block diagram of a graphical display system according to one embodiment of the present invention. In FIG. 2, an exemplary graphical display system 200 includes processor 202 configured to provide information to display element or monitor 210. One or more data sources are coupled to processor 202. These data sources include, but are not limited to, obstacle database 204, navigation and control sensors 208, navigational database 212, terrain database 214 and obstacle sensors 206. In some embodiments, one or more of these data sources are omitted. The databases and sensors are typically located onboard the aircraft but it is not required that they be located on the aircraft. For example, in some embodiments, the databases are located in a central flight tower or mission control center and the sensors are located on a surveillance aircraft or in a surveillance tower which relays obstacle data to the aircraft. Additionally, each of these databases is instantiated as one or more databases. Data in these databases is be stored on any type of suitable medium such as floppy disks, conventional hard disks, CD-ROM, flash ROM, nonvolatile ROM, RAM, or other suitable medium.

Processor 202 includes or interfaces with hardware components that support the graphics display system. By way of example and not by way of limitation, these hardware components include one or more microprocessors, memories, storage devices, interface cards, and other standard components known in the art. Additionally, processor 202 includes or functions with software programs, firmware or computer readable instructions for carrying out various methods, process tasks, calculations, control functions, and the generation of display signals and other data used in the operation of the display system. These instructions are typically stored on any appropriate medium used for storage of computer readable instructions such as floppy disks, conventional hard disks, CD-ROM, flash ROM, nonvolatile ROM, RAM, and other like medium.

Display element 210 includes any display element suitable for displaying the various symbols and information for the operation of embodiments of the present invention. There are many known monitors that are suitable for this task, such as various CRT and flat-panel display systems. Display element 210 is instantiated on a panel mounted display, a heads-up display (HUD) projection, or any other existing or later developed display technology.

Processor 202 generates data for display on display element 210 based on the position of the aircraft and obstacle data. In some embodiments, processor 202 is configured to receive and process navigation and positional data (e.g. position, speed, direction) regarding current aircraft location from navigation and control sensors 208. In other embodiments, processor 202 is configured to receive navigation and positional data from navigational database 212. Navigational database 212 is configured to store data concerning one or more flight paths. In one embodiment utilizing navigational database 212, obstacles can be sought and displayed for different locations along one or more flight paths helping an operator choose the safest path to follow. In yet other embodiments, processor 202 is configured to receive data from navigation and control sensors 208 and from navigational database 212.

Based on the positional data, processor 202 obtains terrain data from terrain database 214 and obstacle data from obstacle database 204. In one embodiment, terrain database contains data regarding the terrain and processor 202 sends a signal to display element 210 to render a simulated graphical representation of the terrain based on that data. In another embodiment, the terrain database contains actual images of the terrain and processor 202 sends a signal to display element 210 to display the actual image based on the positional data.

Processor 202 analyzes the data received from obstacle database 204 and determines if the obstacles are within a selected distance from the aircraft. Obstacles that are not within a selected distance are not displayed. This function saves processor load and reduces display clutter by only displaying obstacles that are of interest to the aircraft. Processor 202 also calculates the display size of obstacles based on the distance to each obstacle. Processor 202 further determines if obstacles within the selected distance are located within a first range of distances or a second range of distances from the aircraft. The two ranges divide the selected distance into two sections and are adjacent but not-overlapping. The first range of distances is a range further from the aircraft than the second range of distances. In one embodiment the first range is from 3 to 10 miles inclusive and the second range is from 0 to 3 miles exclusive. These ranges are provided by way of example and not by way of limitation. In other embodiments, other appropriate ranges are chosen based on the intended application using various criteria, e.g., the speed of the aircraft, size of the aircraft, size of the obstacles, display size, fixed object width selection, minimization of image jump when transitioning from one form to another, threat type (e.g. friend or enemy), obstacle type (e.g. tower, building, bridge, etc.), and other appropriate criteria.

For those obstacles located within the first range of distances, processor 202 sends a signal to display element 210 to render the obstacles as semi-transparent simple line objects along with display size information based on the distance to each obstacle. For those obstacles located within the second range of distances, processor 202 sends a signal to display element 210 to render the obstacles as semi-transparent polygons along with display size information based on the distance to each obstacle. In some embodiments, the transparency level is set at levels which allow substantial blending with background terrain color. In one such embodiment, the transparency level of the line objects and polygons is 50%.

In some embodiments, the data from obstacle database 204 only contains data on the obstacle height and location. In at least one embodiment, when only obstacle height and location data is available, processor 202 will assign a fixed width to the polygons. In one such embodiment, the fixed width is set at 50 feet.

In other embodiments, processor 202 determines if the obstacle data received from obstacle database 204 contains data regarding the shape of the obstacles. When that information is present, processor 202 sends a signal to display element 210 to render the obstacle using polygons representative of actual obstacle structure. For example, if the data indicates that the obstacle is a radio tower, processor 202 sends a signal to display element 210 to render a polygon substantially similar in appearance to a radio tower with the dimensions of the obstacle.

In some embodiments, processor 202 is configured to receive obstacle data from obstacle sensors 206. Obstacle sensors 206 include any number of receivers, infrared camera, laser imagers, millimeter wave cameras or other sensor elements for obtaining obstacle data. Obstacle data obtained from obstacle sensors 206 includes data regarding an obstacle's location, size, and obstacle type, etc. Some types of data will not be obtained for all obstacles.

In some embodiments, obstacle sensors 206 are configured to obtain data regarding obstacles for use by processor 202 in validating the obstacle data obtained from obstacle database 204. In this case processor 202 receives data from obstacle database 204 and from obstacle sensors 206. Processor 202 then compares the data and validates the data from obstacle database 204 or replaces the data with data from obstacle sensors 206 prior to calculating the obstacle display size and sending a signal to display element 210 for displaying the obstacles as described above.

In other embodiments, obstacle sensors 206 are used as the primary source of obstacle data. For example, in military applications, flight paths may not be in well known areas or the obstacles may be temporarily located in the flight path. Accordingly, no obstacle data is available in an obstacle database regarding the obstacles in the flight path. In this situation, processor 202 receives obstacle data from obstacle sensors 206 in place of obstacle database 204 and then processes the data and sends a signal to display element 210 as described above. In one or more embodiments, the data received from obstacle sensors 206 is supplemented by data from obstacle database 204 when available.

In some embodiments, processor 202 analyzes the obstacle data to determine the threat posed by each obstacle and sends a signal to display element 210 to highlight and change the color of displayed obstacles to reflect the obstacle threat. The threat is determined based on the obstacle's size, proximity to the aircraft and flight trajectory. In some embodiments, the highlighting and color change correspond to audio warnings and alerts such as Terrain Awareness and Warning System (TAWS) alerts. In other embodiments, the threat is also determined based on the obstacle status, e.g. known or unknown target, friendly or hostile, etc., and the highlighting and color change are determined based on the obstacle status.

In one embodiment, the display view is an egocentric view (i.e. a view from current aircraft location). In another embodiment, the display view is an exocentric view (i.e. a view from a location other than current aircraft location). In yet another embodiment, a user can select between an egocentric and an exocentric view of the 3-dimensional graphical representation of real space.

Figure 3:
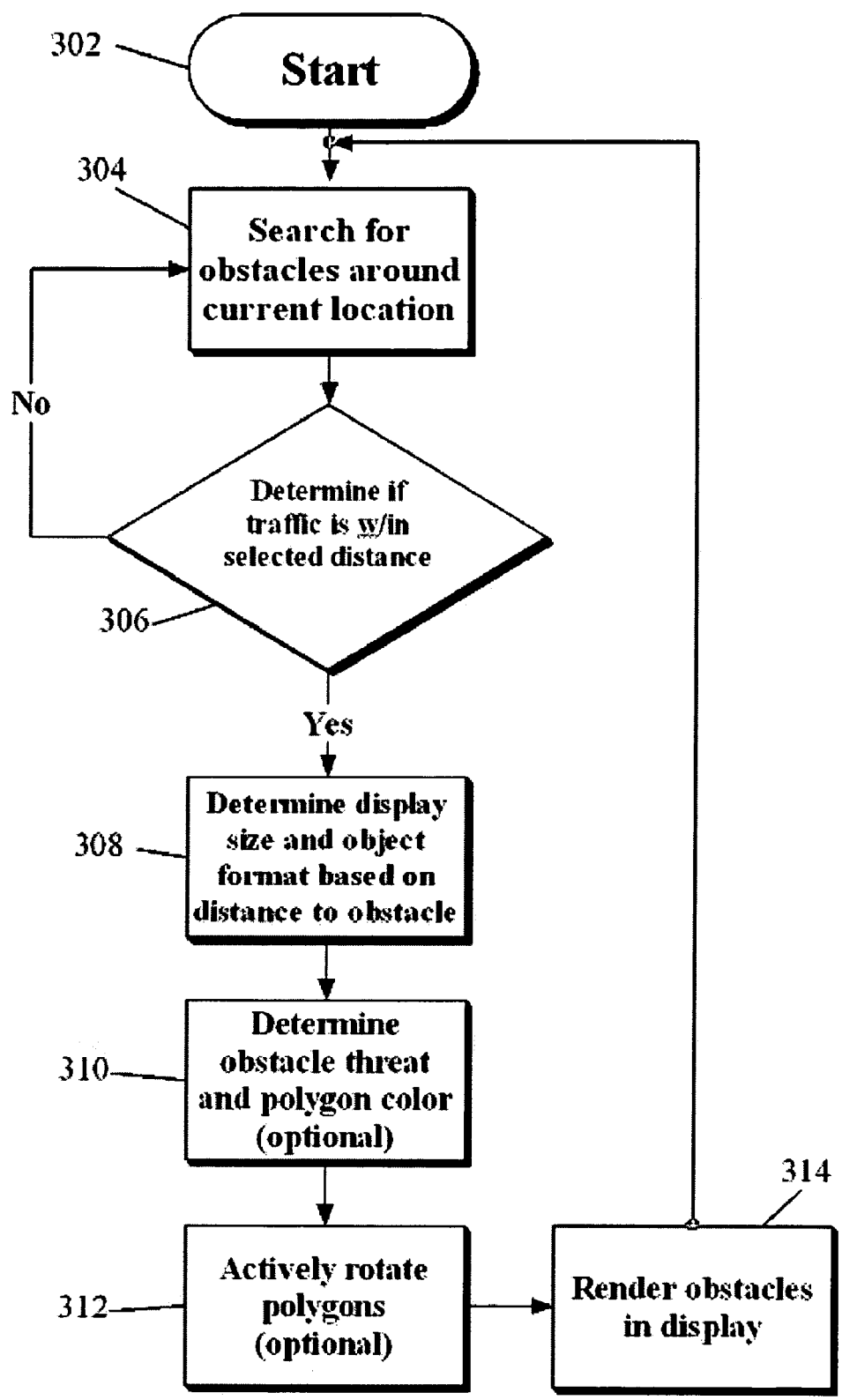
FIG. 3 is a flow chart showing a method of displaying obstacles in perspective view according to one embodiment of the present invention.

FIG. 3 is a flow chart showing a method of displaying obstacles in perspective view according to one embodiment of the present invention. It will be recognized by one of skill in the art that some of the processes described in FIG. 3 may be omitted where appropriate. For example, active rotation at 314 is not always used for polygons as discussed above with regards to FIG. 1.

At 304, obstacles located around a specified position or location are sought. In one embodiment, the searching is accomplished by using one or more processors to search a database of known obstacles. In another embodiment, this searching is accomplished by using sensors. In one such embodiment, these sensors pass data to one or more processors for immediate use. In another such embodiment, these sensors pass data to a memory for recall and use by the one or more processors at a later time.

At 306, it is determined if the found obstacles are located within a selected distance from the specified position, referred to herein as the interest distance. In some embodiments, if the found obstacles are not within the interest distance from the aircraft, the process returns to searching for obstacles around the specified position. This loop of searching and determining if the obstacles found are located within the interest distance continues until some obstacles are found within the interest distance.

The purpose of this loop is to reduce clutter on the display screen. Since the operator typically deals with large amounts of information, it is beneficial to only display obstacles as they become of interest. By only displaying obstacles within a certain interest distance, clutter caused by the display of non-needed information is avoided. In one exemplary embodiment, the interest distance selected is 10 miles. Additionally, by only displaying obstacles as they become of interest, processor load is diminished allowing the processor to work more efficiently on other tasks.

At 308, the object display format for obstacles found within the interest distance is determined based on the distance to the obstacle. The interest distance is divided into two ranges of distances. The distance which divides the interest distance into two ranges is referred to herein as the dividing distance. In one embodiment the dividing distance is 3 miles.

A first range of distances is a set of distances from the dividing distance to the interest distance mentioned above. The second range of distances is a set of distances from the specified position to the dividing distance. Hence, the first range of distances is further from the aircraft. Accordingly, the object format for obstacles in this range is semi-transparent simple line objects whereas the object format for obstacles in the second, closer range is semi-transparent polygons.

Additionally at 308, the display size of each polygon and simple line object is determined based on the distance to each obstacle. As the distance to an obstacle decreases, the size of the polygon representing it increases accordingly. As the distance to an obstacle increases, the size of the polygon representing it decreases. The distance to the obstacle and display size are continuously updated as the method repeats and location information for the obstacle is updated. This perspective view of the obstacles is substantially conformal to a real-world view. In other words, the relative size of the display objects (i.e. closer objects are displayed larger than objects located further away) is substantially similar to a view of the actual objects in the real world.

The display size and object format determined at 308 allows the operator to quickly gain a general sense of distance to a particular obstacle as well as have a perspective view of the relational position of obstacles with respect to each other. This is an advantage over current displays which typically render all obstacles the same size. Those current displays typically cause the operator to spend more time and effort to locate data regarding each obstacle's distance and relative position than the time and effort spent in embodiments of the present invention.

At 310, the threat posed by each obstacle is determined. This determination is based on obstacle data such as the obstacle's location, size, type, and status. The color and highlighting for obstacles is determined based on the threat of each obstacle. The default color for each obstacle is a color substantially blended with the terrain about the obstacle.

At 314, the polygons for obstacles in the second range are actively rotated. This active rotation maintains the face of the polygon substantially facing the display viewer so that no obstacle disappears from view during flight maneuvers. Active rotation is described in more detail with regards to FIG. 1 above. At 316, the obstacles are rendered on a display based on the size, object format, color, and active rotation determinations and calculations made previously. The process then repeats at 304. In one embodiment, the repeat rate is 30 times per second.

Figure 4:
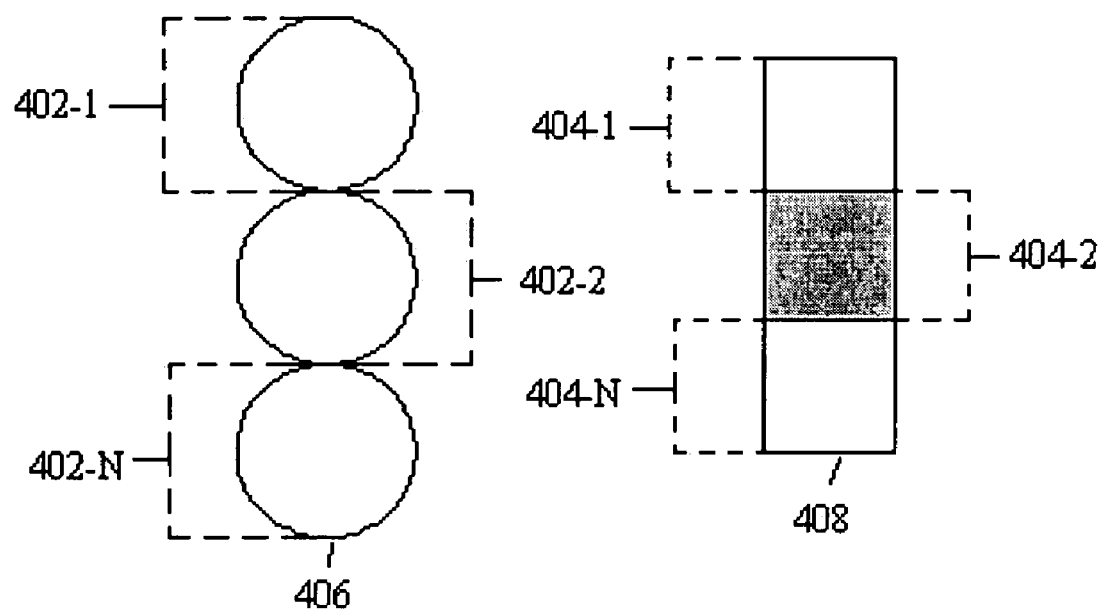
FIG. 4 is a drawing of a graphical display of obstacle height segments according to one embodiment of the present invention.

FIG. 4 is a drawing of a graphical display of obstacle height segments according to one embodiment of the present invention. The graphical display system of this embodiment also improves the utility over existing systems by allowing approximate heights of obstacles 102-1 . . . 102-N in FIG. 1 to be determined without the need for displaying a numerical value. Obstacle heights are displayed using an appropriate number of segments for each obstacle where each segment represents a fixed-height. For example, if each of segments 402-1 . . . 402-N represents a height of 50 feet and N is 3, obstacle 406 would have a height of 150 feet. In one embodiment, the obstacle height information is obtained from a data source. In some embodiments, the obstacle height is always rounded up for obstacles whose heights are not precise round numbers for safety reasons. In some embodiments, heights are represented with polygon segments 404-1 . . . 404-N. In other embodiments, the height is represented using spherical segments 402-1 . . . 402-N. In other embodiments, other shapes may be used, e.g. cylinders, triangles, etc.

In one embodiment, polygon segments 404-1 . . . 404-N alternate transparency levels to distinguish one segment from another. In another embodiment, spherical segments 402-1 . . . 402-N alternate transparency levels to distinguish one segment from another. In another embodiment, polygon segments 404-1 . . . 404-N alternate colors to distinguish one segment from another. In another embodiment, spherical segments 402-1 ... 402-N alternate colors to distinguish one segment from another. In one embodiment, segments 402-1 ... 402-N have the same vertical and horizontal radius. In other embodiments, top segment 402-1 is substantially round while the horizontal radius for lower segments 402-2 ... 402-N increases for each subsequent segment. Likewise, in one embodiment, polygon segments 404-1 ... 404-N have the same width. In other embodiments, the width for polygon segments 404-2 ... 404-N increases for each subsequent segment.

In some embodiments, polygon segments 404-1 ... 404-N are rendered with texture. In one such embodiment, the texture is based on photographs. In other such embodiments, the texture is not based on photographs. In other embodiments, each of polygon segments 404-1 ... 404-N have specific textures for each type of obstacle. In other embodiments, spherical segments 402-1 ... 402-N are rendered with texture. In one such embodiment, the texture is based on photographs. In other embodiments, each of spherical segments 402-1 ... 402-N have specific textures for each type of obstacle.

Although specific embodiments have been illustrated and described herein, it will be appreciated by those of ordinary skill in the art that any arrangement, which is calculated to achieve the same purpose, may be substituted for the specific embodiment shown. For example, although the specific embodiments illustrated are directed at aircraft, the method and apparatus may be used in various embodiments employing various types of crafts, such as submarines, space craft, lunar landers, and UAVs, etc. This application is intended to cover any adaptations or variations of the present invention. Therefore, it is manifestly intended that this invention be limited only by the claims and the equivalents thereof.

What is claimed is:

1. A method for displaying obstacles in perspective-view, the method comprising:
    searching for obstacles around a specified location,
    determining if obstacles are within a selected distance around said specified location,
    rendering each obstacle located within a first range of distances as a single semi-transparent line, and
    rendering obstacles located within a second range of distances as semi-transparent polygons.

2. The method of claim 1 further comprising: determining a display size to substantially conform to a real-world view of forward looking space.

3. The method of claim 1 wherein searching for obstacles further comprises one or more of
    searching an obstacle database for obstacles around a specified location, and
    receiving obstacle data from sensors for obstacles around a specified location.

4. The method of claim 1 further comprising, actively rotating polygons such that a front face of the polygons is substantially facing a viewing point at the center of a display screen.

5. The method of claim 1 further comprising,
    rendering initial polygon color substantially blended with background terrain color,
    receiving data on obstacle threat, and
    changing polygon color and highlighting polygon to match threat data.

6. The method of claim 1 further comprising,
    determining if obstacle data contains data regarding obstacle structure, and
    rendering polygons as representative of obstacle structure if obstacle data contains data regarding structure.

7. The method of claim 1 further comprising, assigning obstacles located within the second range of distances a fixed-width.

8. The method of claim 1 further comprising, rendering the semi-transparent line objects and polygons using a transparency level which allows substantial blending with background terrain color.

9. The method of claim 1 further comprising, displaying obstacle height information by combining one or more segments, wherein each segment represents a fixed-height.

10. The method of claim 9 further comprising, rendering the one or more segments as polygons. with alternating transparency levels.

11. The method of claim 9 further comprising, alternating the transparency levels of the one or more segments.

12. The method of claim 9 further comprising, alternating the colors of the one or more segments.

13. The method of claim 9 further comprising, rendering the one or more segments with texture.

14. The method of claim 9 further comprising, rendering the one or more segments as substantially spherical shapes.

15. The method of claim 14 further comprising, rendering a top segment as substantially spherical, and increasing a horizontal radius for each subsequent segment.

16. A display system comprising:
    a display screen for graphical display of data,
    at least one obstacle data source,
    one or more graphics processors for receiving obstacle data from the at least one obstacle data source, and for providing input to the display screen,
    the display screen displaying obstacles in a 3-dimensional graphical representation of real space, the display of the obstacles varying based on the distance to the obstacles, and
    wherein each obstacle located beyond a selected distance is displayed as a single semi-transparent line object and obstacles located within the selected distance are displayed as semi-transparent polygons, wherein the display size of the obstacles is further varied based on the distance to the obstacles.

17. The display system of claim 16 wherein, the obstacles located within the selected distance are actively rotated such that a front face of the polygons is substantially facing a viewer of the display screen.

18. The display system of claim 16 wherein, the selected distance is 3 miles.

19. The display system of claim 16 wherein, the semi-transparent line object and polygons have a transparency level which allows substantial blending with background terrain color.

20. The display system of claim 16 wherein, the obstacles represented by polygons are assigned a fixed-width for display in the graphical display.

21. The display system of claim 16 wherein, the semi-transparent polygons initially have a color substantially blended with the display's background terrain color, and the semi-transparent polygons change color and are highlighted to match standard audio awareness and warning alerts as threat status is computed and changed in real-time.

22. The display system of claim 16 wherein the at least one obstacle data source further comprises, one or more obstacle databases of known objects, and one or more real time sensors.

23. The display system of claim 16 wherein, the one or more processors are adapted to receive a user input to select between an egocentric and an exocentric view of the 3-dimensional graphical representation of real space.

24. The display system of claim 16 wherein, the display system is a flight deck display system on board an aircraft.

25. The display system of claim 16 wherein, obstacle height information is displayed on the display screen by combining one or more segments, each segment representing a fixed-height.

26. The display system of claim 25 wherein, the one or more segments are each substantially spherical.

27. The display system of claim 25 wherein, the one or more segments are polygons.

28. The display system of claim 25 wherein, the one or more segments alternate transparency levels.

29. The display system of claim 25 wherein, the one or more segments alternate colors.

30. The display system of claim 25 wherein, the one or more segments are rendered with texture.

31. The display system of claim 30 wherein, the texture is based on photographs.

32. A computer readable medium having computer-executable instructions for performing a method comprising:
receiving obstacle data from an obstacle data source,
determining if obstacles are within a selected distance,
determining which obstacles within said selected distance are within a first range of distances and which obstacles are within a second range of distances,
calculating display size of obstacles based on distance to the second range obstacles, and
sending instructions to a display to render each obstacle in said first range of distances as a single semi-transparent line object and to display obstacles in said second range of distances as semi-transparent polygons with display size information based on distance to the obstacles.

33. The computer readable medium of claim 32 having computer-executable instructions for performing a method further comprising:
blending initial line object and polygon color with background terrain color,
receiving data on obstacle threat in real-time, and
changing the polygon color and highlighting the polygon to match the threat data.

34. The computer readable medium of claim 32 having computer-executable instructions for performing a method further comprising:
determining if obstacle data contains data regarding the structure of each obstacle, and
sending instructions to the display to render polygons as representative of obstacle structure for those obstacles with structure data.

35. The computer readable medium of claim 32 having computer-executable instructions for performing a method further comprising, assigning obstacles in said second range of distances a fixed width.

36. The computer readable medium of claim 32 having computer-executable instructions for performing a method further comprising, rendering the semi-transparent line objects and polygons using a transparency level which allows substantial blending with background terrain color.

37. The computer readable medium of claim 32 having computer-executable instructions for performing a method further comprising, displaying obstacle height information by combining one or more segments, wherein each segment represents a fixed-height.

38. The computer readable medium of claim 37 having computer-executable instructions for performing a method further comprising, rendering the one or more segments as substantially circular shapes.

39. The computer readable medium of claim 38 having computer-executable instructions for performing a method further comprising,
rendering a top segment as substantially circular, and
increasing a horizontal radius for each subsequent segment.

40. The computer readable medium of claim 37 having computer-executable instructions for performing a method further comprising, rendering the one or more segments as polygons. with alternating transparency levels.

41. The computer readable medium of claim 37 having computer-executable instructions for performing a method further comprising, alternating the transparency levels of the one or more segments.

42. The computer readable medium of claim 37 having computer-executable instructions for performing a method further comprising, rendering the one or more segments with alternating colors.

43. The computer readable medium of claim 37 having computer-executable instructions for performing a method further comprising, rendering the one or more segments with texture.

* * * * *